(12) United States Patent
Fischbach

(10) Patent No.: US 6,739,864 B2
(45) Date of Patent: May 25, 2004

(54) MOLDING MACHINE

(75) Inventor: Gunther Fischbach, Fürstenfeldbruck (DE)

(73) Assignee: Mannesmann Plastics Machinery GmbH, München (DE)

( * ) Notice: Subject to any disclaimer, the term of this patent is extended or adjusted under 35 U.S.C. 154(b) by 122 days.

(21) Appl. No.: 10/047,247

(22) Filed: Jan. 14, 2002

(65) Prior Publication Data

US 2002/0114862 A1 Aug. 22, 2002

(30) Foreign Application Priority Data

Jan. 12, 2001 (DE) .......................... 101 02 464

(51) Int. Cl.[7] .............................................. B29C 45/64
(52) U.S. Cl. ................. 425/589; 425/451.2; 425/451.7; 425/590; 425/595
(58) Field of Search ................. 425/589, 451.2, 425/451.7, 590, 595

(56) References Cited

U.S. PATENT DOCUMENTS

| | | | | |
|---|---|---|---|---|
| 3,910,736 A | * | 10/1975 | Stachelin et al. | 425/451.2 |
| 5,110,283 A | * | 5/1992 | Bluml et al. | 425/589 |
| 5,368,463 A | * | 11/1994 | Kassner et al. | 425/595 |
| 5,714,180 A | * | 2/1998 | Lampl et al. | 425/589 |

* cited by examiner

*Primary Examiner*—James P. Mackey
(74) *Attorney, Agent, or Firm*—Cohen, Pontani, Lieberman & Pavane

(57) ABSTRACT

A molding machine includes a mold space between two mold carriers. One of the two mold carriers is movable relative to the other by a drive. A separate power unit generates a predetermined closing force between the two mold carriers when the two mold carriers are moved together. The separate power unit comprises, for its actuation, a pressure cushion filled with a composition that is highly viscous by comparison with hydraulic oil.

10 Claims, 1 Drawing Sheet

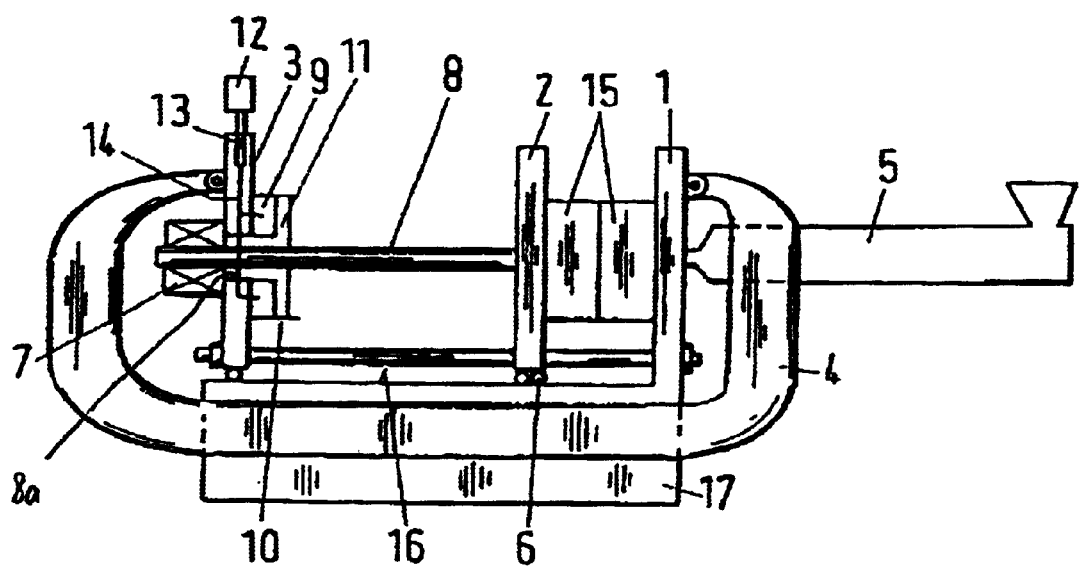

MOLDING MACHINE

BACKGROUND OF THE INVENTION

1. Field of the Invention

The invention relates to a molding machine formed as a press for the production or reshaping of pressings or as an injection molding machine for the injection molding of plastics and having a mold space between two mold carriers, wherein one of the mold carriers is movable relative to the other by a drive.

2. Description of the Related Art

An injection molding machine conventionally comprises two mold halves which are fixed to mold mounting plates and have to be pressed toward one another with great force during the injection of the current molding composition into the mold cavity to ensure that the injected material does not escape through area where the two mold mounting plates are joined. Conventionally, one of the two mold mounting plates is rigidly connected to a machine frame, while the second mold mounting plate is linearly displaceable for the purpose of unmolding each injection molding produced. Therefore, a system such as , for example, a hydraulic cylinder-and-piston system is provided to effect the displacement of the movable mold mounting plate and apply the necessary closure force. Instead of a hydraulic cylinder-and-piston system, the displacement system of the movable mold mounting plate may also be effected by an electromechanical drive.

A plastics injection molding machine is disclosed in EP 0 626 245 A2 in which a flexurally stiff shackle formed in the shape of a recumbent C engages on the back of the fixed mold mounting plate and is guided to the other side of the machine frame of the injection molding machine, the movable mold mounting plate being disposed within the space encompassed by the C-shaped shackle. Disposed between the movable mold mounting plate and the end of the C-shaped shackle which lies opposite the stationary mold mounting plate is a toggle which is selectively actuated via a spindle drive moved by an electric motor. The movable mold mounting plate is retracted (i.e., moved to the open position) by folding the toggle and brought into the closed position by extending the toggle. The closing force here is applied via actuation of the electric motor spindle drive.

An injection molding machine is disclosed in DE 196 43 366 A1 whose mold closing device is likewise actuated by a toggle system driven by an electric motor. A first connecting rod of the toggle system is pivotably connected to a stationary mold mounting plate and a second connecting rod is connected to the movable mold mounting plate. In one embodiment, one of the two connecting rods of the toggle system, which is provided as pair of rods, is formed as a C-shaped shackle which engages around the mold mounting plates. The C-shaped shackle is connected in an articulated manner to the back of the stationary mold mounting plate and at its other end to the second connecting rod. The second connecting rod, for its part, is pivotably connected by means of the shaft of an electrical rotary drive to the back of the movable mold mounting plate and is also connected to the other end of the C-shaped shackle. The toggle system can be selectively folded and extended to a closed position and an open position, respectively, by actuating the rotary drive. A hydraulic piston-and-cylinder system in the form of a short-stroke cylinder is preferably disposed between the stationary mold mounting plate and the point of articulation of the C-shaped shackle. This system sets the mold height and may also be used to apply the closing force with the toggle system closed. In this case, therefore, the toggle system serves merely to perform the displacement movements of the movable mold mounting plate and to lock the closed position, while the extent of the closing force is determined solely by the hydraulic pressure being applied at the time.

A disadvantage of hydraulically actuated plastics injection molding machines or other molding machines with high closing forces is that, to a certain extent, it is always necessary to expect a leakage of hydraulic fluid, in other words, conventionally, hydraulic oil. This is all the more serious if the hydraulic seals become loose due to wear. Precautions therefore have to be taken to prevent damage caused by escaping hydraulic fluid. This disadvantage also occurs in what are known as hybrid machines such as the machine disclosed by DE 196 43 366 A1 in which the displacement movement of the movable mold mounting plate and the generation of the closing force are effected by different drive systems.

SUMMARY OF THE INVENTION

It is an object of the present invention further to develop a molding machine having a mold space between two mold carriers, wherein one of the mold carriers is movable relative to the other by a drive, which minimizes the outlay required for the control of leakages in the drive system.

This object is achieved according to the present invention by a molding machine including two mold carriers defining a mold space therebetween, wherein one of the two mold carriers is movable relative to the other of the two mold carriers via a drive. In addition, a power unit is used for generating a predetermined closing force between the two mold carriers when the two mold carriers are moved together. The separate power unit comprises a pressure cushion filled with a highly viscous composition that has a viscosity greater than that of hydraulic oil.

According to the present invention, the closing force is applied by a hydraulic compressive force. However, this closing force is not applied by using a conventional hydraulic fluid, which generally consists of an oil. In contrast, the present invention applies the closing force via a composition which possesses a comparatively high viscosity. One effect of this is that the occurrence of leakages is prevented from the outset as a consequence of the considerably inferior flow properties of this composition by comparison with a conventional hydraulic fluid. Furthermore, if a leakage does occur, the highly viscous composition escapes only in comparatively small amounts, so that even when a leak is beginning to occur this can easily be identified visually. In addition, the solution according to the present invention has the advantage that even in the event of a larger amount of escaping viscous composition this does not flow away like hydraulic oil to cover a large area but remains in the area close to the point of escape.

Grease is preferably used as the highly viscous composition because of its good lubrication qualities.

An electromechanical drive is chosen as the drive for the molding machine according to the present invention, especially a drive having a ball-rolling spindle drive. It is also advantageous here to drive the spindle or the spindle nut of the ball-rolling spindle drive by an electrical hollow-shafted motor, as such motors generate very high drive torques.

The pressure cushion containing the hydraulic composition is disposed in a pressure cylinder which, with respect to the force flow, is supported on the same part of the molding machine as the drive for the currently movable mold carrier.

A piston in the pressure cylinder applies the pressure in the pressure cushion to the movable mold carrier. The hydraulic pressure of the pressure cushion may be generated via an auxiliary piston whose piston surface is substantially smaller than the piston surface of the actual pressure cylinder. This auxiliary piston may be moved by an electromechanical linear drive. This may, for example, contain a spindle drive or, alternatively, a combination of a rack and pinion or a worm.

The present invention may be used with injection molding machines, especially plastics injection molding machines. In this case the mold carriers are formed as mold mounting plates. The injection molding machine may comprise a tiebarless injection molding machine in which two stationary plates are retained at their backs via C-shaped shackles and the drive for the movable mold mounting plate is supported on one of the two stationary plates. The separate power unit for applying the closing force may either be installed directly in the force flow of the drive for the movable mold mounting plate or may be disposed between the C-shaped shackle and the second plate, which remains stationary. This second, stationarily disposed plate is a plate non-rigidly connected to the machine frame which can move slightly in accordance with the changes in length of the C-shaped shackle taking place under the action of the closing force. By comparison with the displacement travel of the movable mold mounting plate between the open position and the closed position, however, these are only extremely slight changes, so that this plate may be described as remaining virtually stationary.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures and procedures described herein.

BRIEF DESCRIPTION OF THE DRAWINGS

The drawing is a partially cutaway lateral view of an injection molding machine according to an embodiment of the present invention.

DETAILED DESCRIPTION OF THE PRESENTLY PREFERRED EMBODIMENTS

The injection molding machine shown in the drawing comprises a machine frame 17 which is rigidly connected to a fixed mold mounting plate 1. A movable mold mounting plate 2 is mounted on the machine frame so that it is linearly displaceable on a guide track 16 by rollers 6. Two halves of an injection mold 15 are disposed between the two mold mounting plates 1,2. A third plate 3 is disposed on the left-hand side of the machine frame 17. This plate 3, however, is not rigidly connected to the machine bed 17 but is mounted movably, in a similar manner to the mold mounting plate 2.

The fixed mold mounting plate 1 and the third plate 3 are held by a shackle 4, which is articulated on the back of each of the plates 1, 3. The shackle 4 is disposed on both long sides of the machine bed 17, i.e., as a pair. The shackle 4 ensures that the third plate 3 is not significantly displaced. The shackle 4 allows displacements of the third plate to occur only within an order of magnitude corresponding to the change in length of the shackle 4 as a consequence of the closing force acting upon it.

The movable mold mounting plate 2 is connected to the plate 3 via a linear drive and is depicted as a ball-rolling spindle drive including a spindle 8. An electrical rotary drive of the linear drive is arranged on the back of the plate 3 in the form of a hollow-shafted motor 7 which drives the spindle 8 via, for example, a spline connection. The spindle 8 is capable of shifting in the axial direction relative to the hollow-shafted motor 7. The spindle nut is connected to the plate 3 so that it is not rotatable and not translatable in the axial direction. Therefore a rotary movement of the spindle 8 produces a linear displacement of the spindle 8 relative to the plate 3, and thereby produces corresponding movements of the movable mold mounting plate 2. A hydraulic cylinder 10 is connected to the right-hand side of the plate 3. A piston 11 is fixedly connected to the spindle nut (not shown in detail) which is guided in the hydraulic cylinder 10. A pressure cushion 9, preferably consisting of grease, is enclosed in the hydraulic cylinder 10 between the inner piston surface of the piston 11 and the right-hand side of the plate 3. An auxiliary piston 13 is disposed in the upper part of the plate 3. The auxiliary piston 13 is connected via a hydraulic line 14 to the pressure cushion 9. The auxiliary piston 13 may be displaced linearly by an electric motor 12 such as, for example, via a spindle drive or a rack drive, and thus exert a variable force on the pressure cushion 9. The piston surface of the auxiliary piston 13 is substantially smaller than the effective piston surface of the piston 11 in the hydraulic cylinder 10. Accordingly, an exceptionally high force transmission is obtained with regard to the force introduced into the spindle 9, i.e., the closing force for the injection mold 15. Because of the comparatively high viscosity of the grease filling of the pressure cushion 9, leakages at the hydraulic cylinder 10 occur relatively rarely. If leakages do occur, however, then all the consequences are very easy to control, first because the escape of grease from the pressure cushion 9 is easy to detect visually and secondly because it cannot flow away like hydraulic fluid to spread in an uncontrolled manner over a large area. An injection molding unit 5 is provided to inject the molding composition into the mold cavity, which is enclosed by the two halves of the injection mold 15.

As an alternative, the spindle drive could also operate with a rotatable spindle nut which is disposed in the hollow-shafted motor 7. In this alternative embodiment, the spindle 8 would have to be retained in a manner secure against rotation and locking of the rotation of the spindle nut during the generation of pressure by the pressure cushion 9 would have to be ensured.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A molding machine, comprising:

two mold carriers defining a mold space therebetween, wherein one of said two mold carriers is movable relative to the other of said two mold carriers;

a drive for moving said one of said two mold carriers; and a power unit for generating a predetermined closing force between said two mold carriers when said two mold carriers are moved together, wherein the separate power unit comprises a pressure cushion filled with a highly viscous composition that has a viscosity greater than that of hydraulic oil.

2. The molding machine of claim 1, wherein said drive comprises an electromechanical drive.

3. The molding machine of claim 2, wherein said drive comprises a ball-rolling spindle drive.

4. The molding machine of claim 2, wherein said drive comprises a hollow-shafted motor, a spindle and a spindle nut and wherein said hollow-shafted motor is operatively connected for effecting linear movement of said spindle.

5. The molding machine of claim 1, further comprising a pressure cylinder, wherein said pressure cylinder and said drive are supported on the same part of said molding machine, and wherein said pressure cushion is disposed in said pressure cylinder.

6. The molding machine of claim 5, further comprising an auxiliary piston arranged for generating the pressure of said pressure cushion, wherein a piston surface of said auxiliary piston is smaller than a piston surface of said pressure cylinder.

7. The molding machine of claim 6, further comprising an electromechanical linear drive operatively arranged for moving said auxiliary piston.

8. The molding machine of claim 1, wherein said highly viscous composition comprises grease.

9. The molding machine of claim 1, wherein said molding machine comprises an injection molding machine and said mold carriers comprise mold mounting plates.

10. The molding machine of claim 9, wherein said injection molding machine comprises a tiebarless injection molding machine and further comprises a C-shaped shackle and a third plate, wherein said third plate and said other of said two molded carriers are retained at said C-shaped shackle and wherein said drive for said one of said two mold carriers is supported on one of said third plate and said other of said two mold carriers.

* * * * *